United States Patent [19]

Riggins et al.

[11] Patent Number: 4,982,987
[45] Date of Patent: Jan. 8, 1991

[54] MASONRY BLOCK TOOL

[76] Inventors: Clifford H. Riggins, 700 W. 60th St., Anderson, Ind. 46013; Terry L. Riggins, 2811 S. Rangeline Rd., Anderson, Ind. 46017

[21] Appl. No.: 372,262
[22] Filed: Jun. 27, 1989
[51] Int. Cl.$^5$ .............................................. B65G 7/12
[52] U.S. Cl. ........................................ 294/62; 294/15
[58] Field of Search .............................. 294/11, 15–17, 294/26, 27.1, 34, 62, 92, 103.1; 52/749, DIG. 1

[56] References Cited

U.S. PATENT DOCUMENTS

| | | | |
|---|---|---|---|
| 370,565 | 9/1887 | Soule | 294/62 |
| 408,380 | 8/1889 | Dutton | 294/26 |
| 615,355 | 12/1898 | Green | 294/26 |
| 673,937 | 5/1901 | Zirckel | 294/62 |
| 1,834,503 | 12/1931 | Smith | 294/92 X |
| 2,378,454 | 6/1945 | Werling | 294/15 |
| 2,541,863 | 2/1951 | Deans et al. | 294/62 |
| 2,652,278 | 9/1953 | Allen | 294/62 X |
| 2,808,286 | 10/1957 | Lyon | 294/62 |
| 2,967,730 | 1/1961 | Vann | 294/62 |
| 4,463,979 | 8/1984 | Lybolt | 294/62 |

FOREIGN PATENT DOCUMENTS

| | | | |
|---|---|---|---|
| 10374 | 2/1899 | Sweden | 294/17 |
| 857839 | 1/1961 | United Kingdom | 294/15 |
| 1354500 | 5/1974 | United Kingdom | 294/15 |

OTHER PUBLICATIONS

1989 Goldblatt ® Tool Co. Catalog, p. 41, bottom right corner, "Block Tongs" Advertisement.

Primary Examiner—Johnny D. Cherry
Attorney, Agent, or Firm—Woodard, Emhardt, Naughton, Moriarty & McNett

[57] ABSTRACT

A masonry block tool for picking up, transporting and laying webbed masonry blocks, comprising a main handle member, a pair of aligned cross handle members integral with the main handle member, a downwardly projecting and forward angling tongue member fixable to the main handle member and disposed such that the tongue member lies in a plane perpendicular to the center line of the cross handle members, a downwardly projecting end blade member integral with the end of the main handle member at the end thereof opposite the cross handle members and disposed such that the end blade member and the main handle member are at right angles where joined and such that the end blade member is disposed in a plane lying perpendicular to the plane in which the tongue member lies.

10 Claims, 3 Drawing Sheets 4,982,987

MASONRY BLOCK TOOL

BACKGROUND OF THE INVENTION

The present invention generally relates to material handling tools of the masonry trade, and more particularly to a masonry block tool that greatly eases the transporting and laying of webbed masonry blocks.

The laying of heavy masonry blocks can quickly overtax a mason's lower back muscles to the point of causing backache and consequent loss of efficiency and productivity. Known masonry tools for picking up and transporting masonry blocks from one point to another on a job site have proven to be ill-suited to the dual roll of assisting the mason in laying the masonry blocks, when precise handling of the blocks to insure proper placement is the most difficult and strenuous.

The novel masonry block tool of the present invention not only eases the picking up and transporting of webbed masonry blocks, but also greatly eases the laying of such blocks.

SUMMARY OF THE INVENTION

One embodiment of the present invention is a masonry block tool for picking up, transporting and laying webbed masonry blocks, comprising a main handle member with a first end and a second end; a pair of aligned cross handle members integral with the main handle member and disposed at right angles thereto at a location along the main handle member closer to the first end than to the second end; a downwardly projecting and forward angling tongue member integral with the main handle member at a point closer to the second end than to the first end of the main handle member and disposed such that the tongue member lies in a plane perpendicular to the center line of the cross handle members; and a downwardly projecting end blade member with a top end and a bottom end, the end blade member being integral with the second end of the main handle member at the top end of the end blade member and disposed such that the end blade member and the main handle member are at right angles at the second end and such that the end blade member is disposed in a plane lying perpendicular to the plane in which the tongue member lies.

Another embodiment of the present invention is a masonry block tool for picking up, transporting and laying webbed masonry blocks, comprising a main handle member with a first end and a second end; a pair of aligned cross handle members integral with the main handle member and disposed at right angles thereto at a location along the main handle member closer to the first end than to the second end; a downwardly projecting and forward angling tongue member with means to adjustably fix the tongue member to the main handle member along a locus of points that are closer to the second end than to the first end of the main handle member, the means disposing the tongue member such that when fixed it lies in a plane perpendicular to the center line of the cross handle members; and a downwardly projecting end blade member with a top end and a bottom end, the end blade member being integral with the second end of the main handle member at the top end of the end blade member and disposed such that the end blade member and the main handle member are at right angles at the second end and such that the end blade member is disposed in a plane lying perpendicular to the plane in which the tongue member lies.

It is an object of the present invention to provide a masonry block handling tool that eases the picking up and transporting and laying of webbed masonry blocks.

It is an object of the present invention to provide a masonry block handling tool that can be used with any webbed masonry block.

Related objects and advantages of the present invention will be apparent from the following descriptions.

DESCRIPTION OF THE PREFERRED EMBODIMENTS

Figure 4:
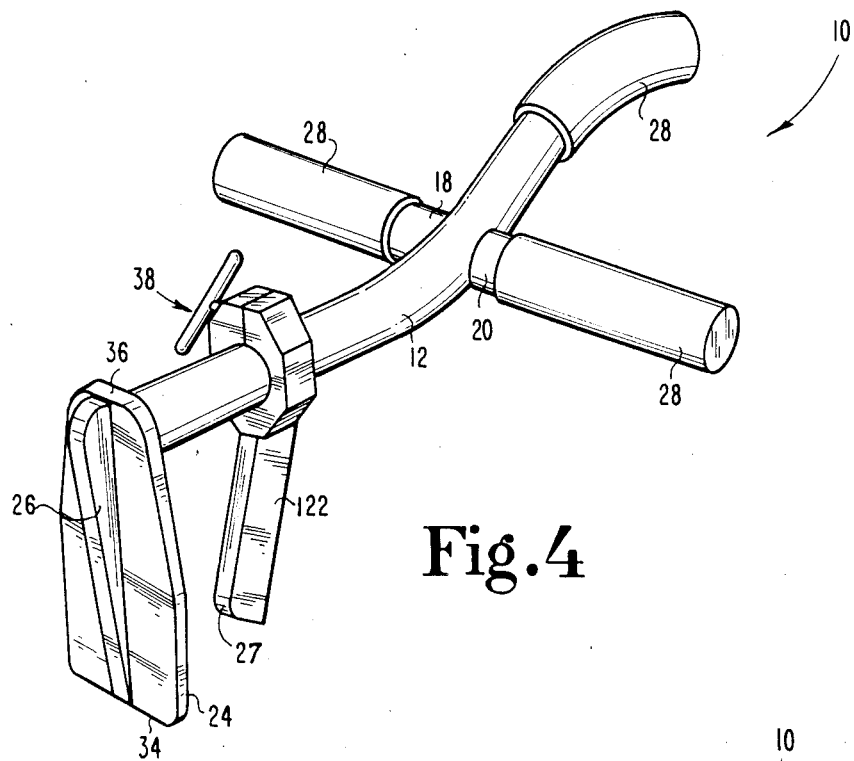
FIG. 4 is a perspective view of an alternate preferred embodiment of the masonry block tool of the present invention.

For the purposes of promoting an understanding of the principles of the invention, reference will now be made to the embodiments illustrated in the drawings, and specific language will be used to describe the same. It will nevertheless be understood that no limitation of the scope of the invention is thereby intended, such alterations and further modifications in the illustrated devices, and such further applications of the principles of the invention as illustrated therein, being contemplated as would normally occur to one skilled in the art to which the invention relates.

Figure 1:
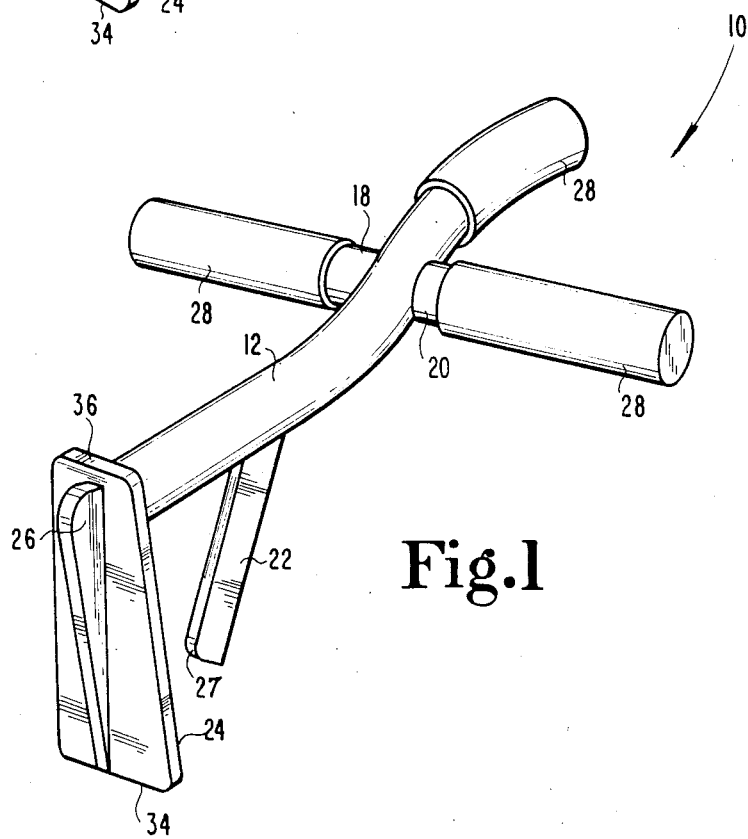
FIG. 1 is a perspective view of the preferred embodiment of the masonry block tool of the present invention.
Figure 3:
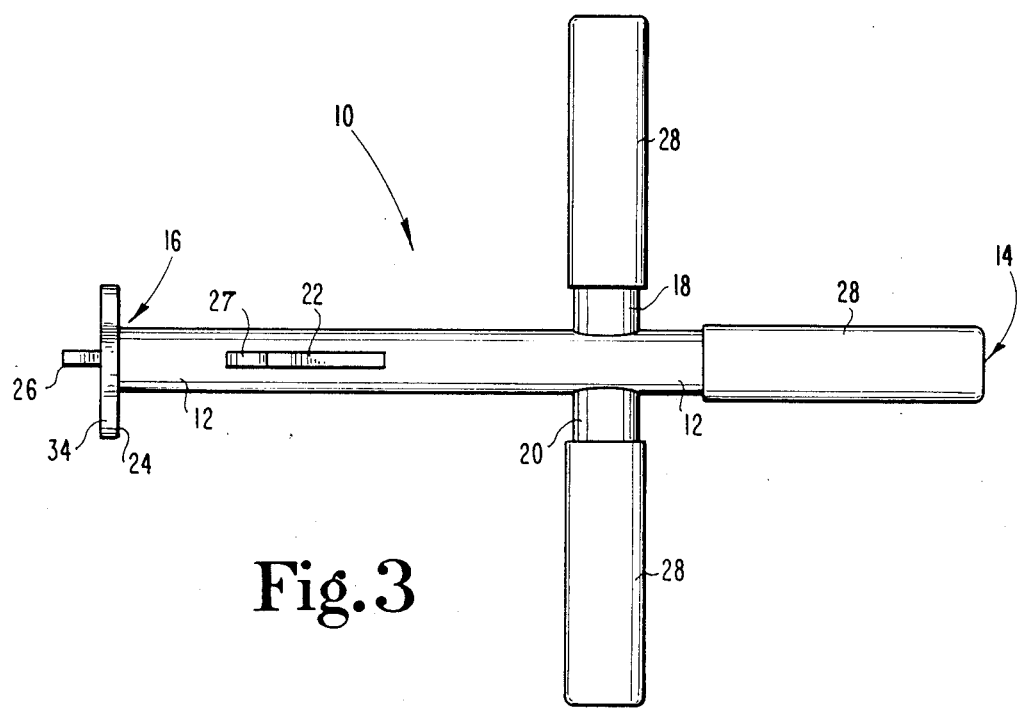
FIG. 3 is a bottom plan view of the masonry block tool of FIG. 1.

Referring now to the drawings, there is shown in FIG. 1 a preferred embodiment of the masonry block tool 10 of the present invention. This preferred embodiment is composed of a main handle member 12 with a first end 14 and a second end 16, a pair of aligned cross handle members 18 and 20 integral with main handle member 12 at right angles thereto and disposed closer to the first end 14 than to the second end 16 of main handle member 12, a downwardly projecting and forward angling tongue member 22 integral with main handle member 12 and disposed closer to the second end 16 than to the first end 14 of main handle member 12 in a plane perpendicular to the center line of cross handle members 18 and 20, and a downwardly projecting end blade member 24 with a top end 36 and a bottom end 34, the top end of end blade member 24 being integral with the main handle member 12 at second end 16 such that end blade member 24 and second end 16 of main handle member 12 are approximately at right angles, end blade member 24 also being disposed in a plane lying perpendicular to the plane in which tongue member 22 lies.

Figure 2:
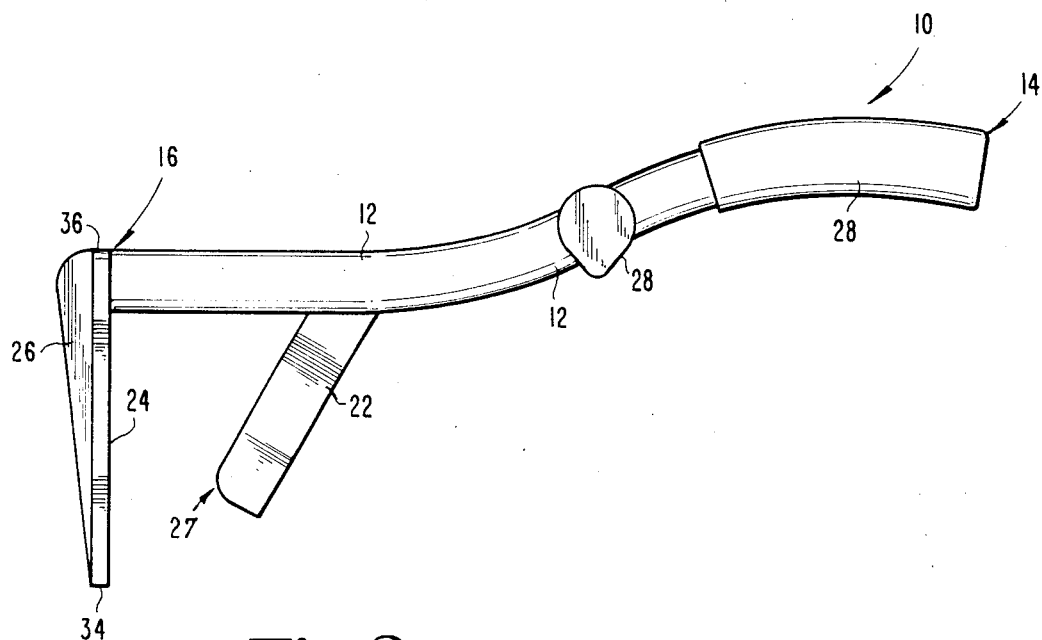
FIG. 2 is a left side elevational view of the masonry block tool of FIG. 1.

Referring now to FIG. 2, in the preferred embodiment to date, first end 14 of main handle member 12 and first and second cross handle members 18 and 20 are elevated above second end 16 of main handle member 12 by imparting an "S" bend to main handle member 12 beginning at about the mid-point of main handle member 12 and ending at first end 14. As will be explained further below, this "S" bend in main handle member 12 provides hand clearance for the mason between main handle member 12 and a masonry block being maneuvered with the masonry block tool 10 of the present invention. Also to facilitate hand holds of the preferred embodiment, the first end 14 of main handle member 12 and cross handle members 18 and 20 have been provided with overlaying rubberlike hand grips 28 of the type commonly found on bicycle handle bars and the like.

Referring still to FIG. 2, in the preferred embodiment to date, end blade member 24 is reinforced by rib member 26, which serves to stiffen end blade member 24. Also, where tongue member 22 lies closest to end blade member 24, tongue member 22 is provided with rounded surface 27 to improve tongue member 22 contact with the webs of masonry blocks, as will be discussed more fully below.

Preferred materials and construction techniques to date have included, in addition to the rubberlike grips 28 discussed above, fashioning main handle member 12 and cross handle members 18 and 20 from anodized aluminum tubing. Tongue member 22, end blade member 24 and rib member 26 have been fashioned from anodized aluminum sheeting. These aluminum components have been integrally joined as described using conventional welding techniques. Obviously, other suitable materials and construction techniques may be utilized. As an example, the masonry block tool 10 of the present invention may be cast as a single piece, absent of course the rubberlike grips 28 of the preferred embodiment, in the conventional manner many tools are manufactured today.

Figure 5:
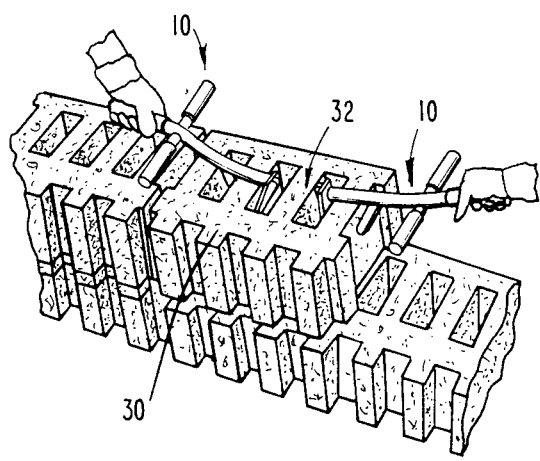
FIG. 5 is a perspective view of two masonry block tools of FIG. 1 being used in the laying of a masonry block.

Referring now to FIGS. 2 and 5, the masonry block tool 10 of the present invention may be used to pickup, transport and lay any masonry block 30 that has webs 32 (FIG. 5). As shown in FIG. 5, masonry block tool 10 of the present invention is placed around either an endmost or an interior web, 32 of masonry block 30 such that a web 32 is positioned between end blade member 24 and rounded surface 27 of tongue member 22 (FIG. 2). The distance between end blade member 24 and rounded surface 27 is therefore selected to be just slightly greater than the width of the web of the masonry block 30 to be laid. With the masonry block tool 10 so positioned, the mason can then either use both of his hands and grasp cross handle members 18 and 20, or use a single hand and grasp main handle member 12 at its first end 14, and, using the leverage provide by main handle member 12 in cooperation with end blade member 24 and tongue member 22, use the masonry block tool 10 of the Present invention to pick up, transport and lay a masonry block 30 with proven greater ease and comfort over any known prior material handling device for the masonry trade. As can be seen in FIG. 5, the "S" bend in main handle member 12 disposed at its first end 14 provides hand clearance for the mason above the adjoining masonry blocks that have already been laid.

As described above, a masonry block tool 10 of the present invention can be sized to accommodate the web width of any webbed masonry block by varying the width between end blade member 24 and the rounded surface 27 of tongue member 22. Referring now to FIG. 4, in an alternate, and equally preferred, embodiment, the position of tongue member 122 along main handle member 12 can be varied by providing tongue member 122 with means by which its position along main member 12 can be fixably adjusted, The preferred means to date has been a thumb screw vise-like device 38 that is integral with tongue member 122 but which freely travels along main handle member 12 when the thumb screw of device 38 is loosened. In this fashion, a single adjustable masonry block tool 10 will accommodate a large number of varyingly sized masonry block webs.

While the invention has been illustrated and described in detail in the drawings and foregoing description, the same is to be considered as illustrative and not restrictive in character, it being understood that only the preferred embodiments to date have been shown and described. All changes and modifications that come within the spirit of the invention are desired to be protected.

What is claimed is:

1. A masonry block tool for picking up, transporting and laying webbed masonry blocks, comprising:
    a main handle member with a first end and a second end;
    a pair of aligned cross handle members integral with said main handle member and disposed at right angles thereto at a location along said main handle member closer to said first end than to said second end;
    a downwardly projecting and forward angling tongue member integral with said main handle member at a point closer to said second end than to said first end of said main handle member and disposed such that said tongue member lies in a plane perpendicular to the center line of said cross handle members; and
    a downwardly projecting end blade member with a top end and a bottom end, said end blade member being integral with said second end of said main handle member at said top end of said end blade member and disposed such that said end blade member and said main handle member are at right angles at said second end and such that said end blade member is disposed in a plane lying perpendicular to the plane in which said tongue member lies.

2. The masonry block tool of claim 1 and further comprising:
    an "S" bend in said main handle member beginning at about the mid-point thereof and ending at said first end of said main handle member, disposing said first end of said main handle member and said first and second cross handle members such that they are above said second end of said main handle member.

3. The masonry block tool of claim 2 and wherein said first end of said main handle member and said cross handle members each include an overlaying hand grip.

4. The masonry block tool of claim 1 wherein said end blade member includes a reinforcing rib member between said top end and said bottom end to stiffen said end blade member.

5. The masonry block tool of claim 1 wherein said tongue member is provided with a rounded surface at its closest proximity to said end blade member to improve tongue member contact with webs of masonry blocks.

6. A masonry block tool for picking up, transporting and laying webbed masonry blocks, comprising:
    a main handle member with a first end and a second end;
    a pair of aligned cross handle members integral with said main handle member and disposed at right angles thereto at a location along said main handle member closer to said first end than to said second end;

a downwardly projecting and forward angling tongue member with means to adjustably fix said tongue member to said main handle member along a locus of points that are closer to said second end than to said first end of said main handle member, said means disposing said tongue member such that when fixed it lies in a plane perpendicular to the center line of said cross handle members; and a downwardly projecting end blade member with a top end and a bottom end, said end blade member being integral with said second end of said main handle member at said top end of said end blade member and disposed such that said end blade member and said main handle member are at right angles at said second end and such that said end blade member is disposed in a plane lying perpendicular to the plane in which said tongue member lies.

7. The masonry block tool of claim 6 and further comprising:

an "S" bend in said main handle member beginning at about the mid-point thereof and ending at said first end of said main handle member, disposing said first end of said main handle member and said first and second cross handle members such that they are above said second end of said main handle member.

8. The masonry block tool of claim 7 and wherein said first end of said main handle member and said cross handle members each include an overlaying hand grip.

9. The masonry block tool of claim 6 wherein said end blade member includes a reinforcing rib member between said top end and said bottom end to stiffen said end blade member.

10. The masonry block tool of claim 6 wherein said tongue member is provided with a rounded surface at its closest proximity to said end blade member to improve tongue member contact with webs of masonry blocks.

* * * * *